US011679931B2

(12) United States Patent
Ustach et al.

(10) Patent No.: US 11,679,931 B2
(45) Date of Patent: Jun. 20, 2023

(54) PALLET SHELF

(71) Applicant: McCue Corporation, Danvers, MA (US)

(72) Inventors: Thomas Ustach, Boston, MA (US);
Matt O'Brien, Newburyport, MA (US);
Teodoro A. Mesa, Lynn, MA (US)

(73) Assignee: McCue Corporation, Danvers, MA (US)

(*) Notice: Subject to any disclaimer, the term of this patent is extended or adjusted under 35 U.S.C. 154(b) by 0 days.

(21) Appl. No.: 17/391,573

(22) Filed: Aug. 2, 2021

(65) Prior Publication Data

US 2022/0033182 A1 Feb. 3, 2022

Related U.S. Application Data

(60) Provisional application No. 63/059,388, filed on Jul. 31, 2020.

(51) Int. Cl.
  *B65G 1/04* (2006.01)
(52) U.S. Cl.
  CPC ...................................... *B65G 1/04* (2013.01)
(58) Field of Classification Search
  CPC ........ B65G 1/04; B65G 1/02; B65G 2207/40; A47B 95/043; E01F 15/141; E04F 19/026
  See application file for complete search history.

(56) References Cited

U.S. PATENT DOCUMENTS

| | | | | |
|---|---|---|---|---|
| 3,796,410 A | * | 3/1974 | Konstant | B65G 1/02 |
| | | | | 256/1 |
| 4,911,971 A | * | 3/1990 | McCue | E04F 19/026 |
| | | | | 293/126 |
| 4,955,490 A | * | 9/1990 | Schafer | A47B 96/02 |
| | | | | 211/187 |
| 4,981,225 A | * | 1/1991 | Cole | B65G 1/02 |
| | | | | 211/208 |
| 5,096,753 A | * | 3/1992 | McCue | E04F 19/026 |
| | | | | 24/297 |
| 5,369,925 A | * | 12/1994 | Vargo | E01F 15/141 |
| | | | | 211/183 |
| 5,573,125 A | * | 11/1996 | Denny | B65G 1/02 |
| | | | | 211/183 |
| RE35,971 E | * | 11/1998 | Kessler | E04F 19/028 |
| | | | | 24/297 |
| 5,891,534 A | * | 4/1999 | Sabin | E04F 19/028 |
| | | | | 428/122 |
| 6,173,846 B1 | * | 1/2001 | Anderson | A47B 47/027 |
| | | | | 211/183 |
| 6,205,741 B1 | * | 3/2001 | Couto | A47B 95/043 |
| | | | | 52/717.03 |
| 6,242,070 B1 | * | 6/2001 | Gillispie | E01F 15/141 |
| | | | | 428/122 |

(Continued)

FOREIGN PATENT DOCUMENTS

| | | | | |
|---|---|---|---|---|
| FR | 2897603 A1 | * | 8/2007 | ............... B65G 1/00 |
| GB | 2470220 A | * | 11/2010 | ............... B65G 1/00 |
| GB | 2525617 A | * | 11/2015 | ............... B65G 1/02 |

*Primary Examiner* — Patrick D Hawn
(74) *Attorney, Agent, or Firm* — Occhiuti & Rohlicek LLP

(57) ABSTRACT

A shelving assembly includes a frame having a number of sides, the frame configured to be affixed to a surface and a deck disposed on top of the frame. A first side is configured to absorb a force of impact of an object striking the first side of the frame while preventing deformation of the frame.

17 Claims, 4 Drawing Sheets

(56) References Cited

U.S. PATENT DOCUMENTS

| | | | | |
|---|---|---|---|---|
| 6,289,836 B1* | 9/2001 | Tellex | E02B 3/26 | 267/140 |
| 6,385,939 B1* | 5/2002 | Stout | G09F 15/0025 | 52/287.1 |
| 6,722,512 B2* | 4/2004 | Scully | A47F 5/13 | 211/183 |
| 7,014,053 B2* | 3/2006 | Calleja | F16P 1/00 | 182/138 |
| 7,090,428 B2* | 8/2006 | Hinojosa | E01F 15/0469 | 404/9 |
| 7,249,442 B2* | 7/2007 | Pellegrino | A47F 5/0018 | 248/564 |
| 7,299,579 B2* | 11/2007 | Lowry | G09F 3/204 | 40/642.02 |
| 7,430,978 B2* | 10/2008 | Rezzonico | B63B 59/02 | 114/219 |
| 7,770,861 B2* | 8/2010 | Huxtable | E01F 15/141 | 248/345.1 |
| 8,267,262 B2* | 9/2012 | Thelwell | A47B 95/043 | 5/663 |
| 8,267,263 B2* | 9/2012 | Hamby | B65D 19/0095 | 108/57.33 |
| 9,414,677 B2* | 8/2016 | Sahm, III | B65G 1/02 | |
| 9,737,143 B2* | 8/2017 | Ramon | A47B 95/043 | |
| 9,752,291 B2* | 9/2017 | Michael | E01F 15/141 | |
| 9,986,831 B2* | 6/2018 | Smith | A47B 95/043 | |
| 10,060,154 B2* | 8/2018 | McCue | B65G 1/02 | |
| 10,098,458 B2* | 10/2018 | Lindmark | B65G 1/02 | |
| 10,238,211 B2* | 3/2019 | Meiser | E04C 3/04 | |
| 10,351,342 B2* | 7/2019 | Rauwerdink | A47B 47/027 | |
| 10,813,455 B2* | 10/2020 | Ustach | F16B 5/128 | |
| 10,926,921 B2* | 2/2021 | Rølund | B65D 19/385 | |
| 11,097,677 B1* | 8/2021 | DiAntonio | E04F 19/026 | |
| 2005/0095413 A1* | 5/2005 | Wallace | F16F 3/093 | 264/260 |
| 2005/0284830 A1* | 12/2005 | Snyker | A47F 5/103 | 211/133.4 |
| 2011/0284710 A1* | 11/2011 | Wallace | B32B 3/06 | 248/345.1 |
| 2011/0309044 A1* | 12/2011 | Morrow | A47F 5/005 | 211/184 |
| 2014/0110547 A1* | 4/2014 | Consaul | B65G 1/02 | 248/231.9 |
| 2015/0060381 A1* | 3/2015 | Consaul | B65G 1/02 | 211/183 |
| 2015/0158629 A1* | 6/2015 | Harris | A47B 87/0215 | 108/51.11 |
| 2016/0007740 A1* | 1/2016 | Consaul | B65G 1/02 | 211/187 |
| 2021/0032025 A1* | 2/2021 | Iellimo | B65G 1/04 | |
| 2021/0093080 A1* | 4/2021 | Iellimo | A47B 47/021 | |
| 2022/0106749 A1* | 4/2022 | Ustach | E01C 11/222 | |

* cited by examiner

PALLET SHELF

CROSS-REFERENCE TO RELATED APPLICATIONS

This application claims priority to U.S. Provisional Application No. 63/059,388, filed on Jul. 31, 2020, the contents of which are hereby incorporated by reference in their entirety.

BACKGROUND OF THE INVENTION

This invention relates to a pallet shelf.

Pallet shelving is a storage system designed to store materials on pallets (or "skids"). In general, pallet shelving allows for the storage of palletized materials in horizontal rows with multiple levels. Material handing vehicles are usually used to place loaded pallets onto the racks for storage and to retrieve loaded pallets from the racks at a later time.

One danger associated with pallet shelving systems arises when material handling vehicles (e.g., forklift trucks, tuggers, reach trucks, or pickers) interact with the shelving systems. In one example of such an interaction, a material handling vehicle (possibly with a human operator) may drive under the lowest shelf of the shelving system (sometimes referred to as an "underride"), potentially harming the vehicle, the operator, and/or the shelving system.

SUMMARY OF THE INVENTION

Aspects described herein prevent certain dangerous interactions (such as the interaction described above) between material handling vehicles and pallet shelving systems. For example, aspects may include a pallet shelf that is affixed to the ground under a pallet shelving system. The pallet shelf is configured to bear palletized materials and also acts as a physical impediment, blocking material handling vehicles from driving under the lowest shelf of the shelving system. In some examples, the pallet shelf includes bumpers or reinforced sections to prevent damage to the shelf and the material handing vehicle and operator upon impact.

In a general aspect, a shelving assembly includes a frame having a number of sides, the frame configured to be affixed to a surface and a deck disposed on top of the frame. A first side is configured to absorb a force of impact of an object striking the first side of the frame while preventing deformation of the frame.

Aspects may include one or more of the following features.

The first side of the frame may include a bumper assembly for absorbing the force of impact of the object striking the first side of the frame. The bumper assembly may include an impact absorption mechanism. The impact absorption mechanism may include a resilient cover, a load transfer member, and a resilient impact absorption member. The resilient impact absorption member may be disposed between the load transfer member and the frame such that at least some force applied to the load transfer member is absorbed by the resilient impact absorption member rather than being transferred to the frame. The resilient cover may be coupled to the load transfer member such that at least some force applied to the resilient cover is absorbed by the resilient cover rather than being transferred to the load transfer member.

A portion of the load transfer member may extend into a side of the frame. The side of the frame may include one or more receptacles and the portion of the load transfer member extends into the one or more receptacles. A corresponding fastener of one or more fasteners may extend into each of the one or more receptacles, wherein each fastener is coupled to the portion of the load transfer member and retains at least some of the portion of the load transfer member in the receptacles.

The first side of the frame may have a material thickness configured to prevent deformation of the frame occurs upon being struck by the object. The frame may include one or more reinforcing ribs to prevent deformation of the frame upon being struck by the object. One or more sides of the plurality of sides may include one or more notches for providing access to an area beneath the shelving assembly. The shelving assembly may include a positioning member for guiding positions of objects placed on the deck of the shelving assembly. The positioning member may be attached to a side of the frame and extends above the deck of the shelving assembly. The frame may include one or more attachment points for fastening the shelving assembly to a surface.

Aspects may have one or more of the following advantages.

Aspects advantageously augment conventional shelving systems by providing a pallet storage solution that both keeps pallets off the ground and prevents material handling vehicles from dangerously traveling under pallet shelves of the shelving systems.

The bumper of the pallet shelf advantageously provides two-levels of impact absorption: a first level of impact absorption for minor impacts and a second level of impact absorption for more significant impacts.

Other features and advantages of the invention are apparent from the following description, and from the claims.

DETAILED DESCRIPTION

1 Pallet Shelf with Bumper

Figure 1:
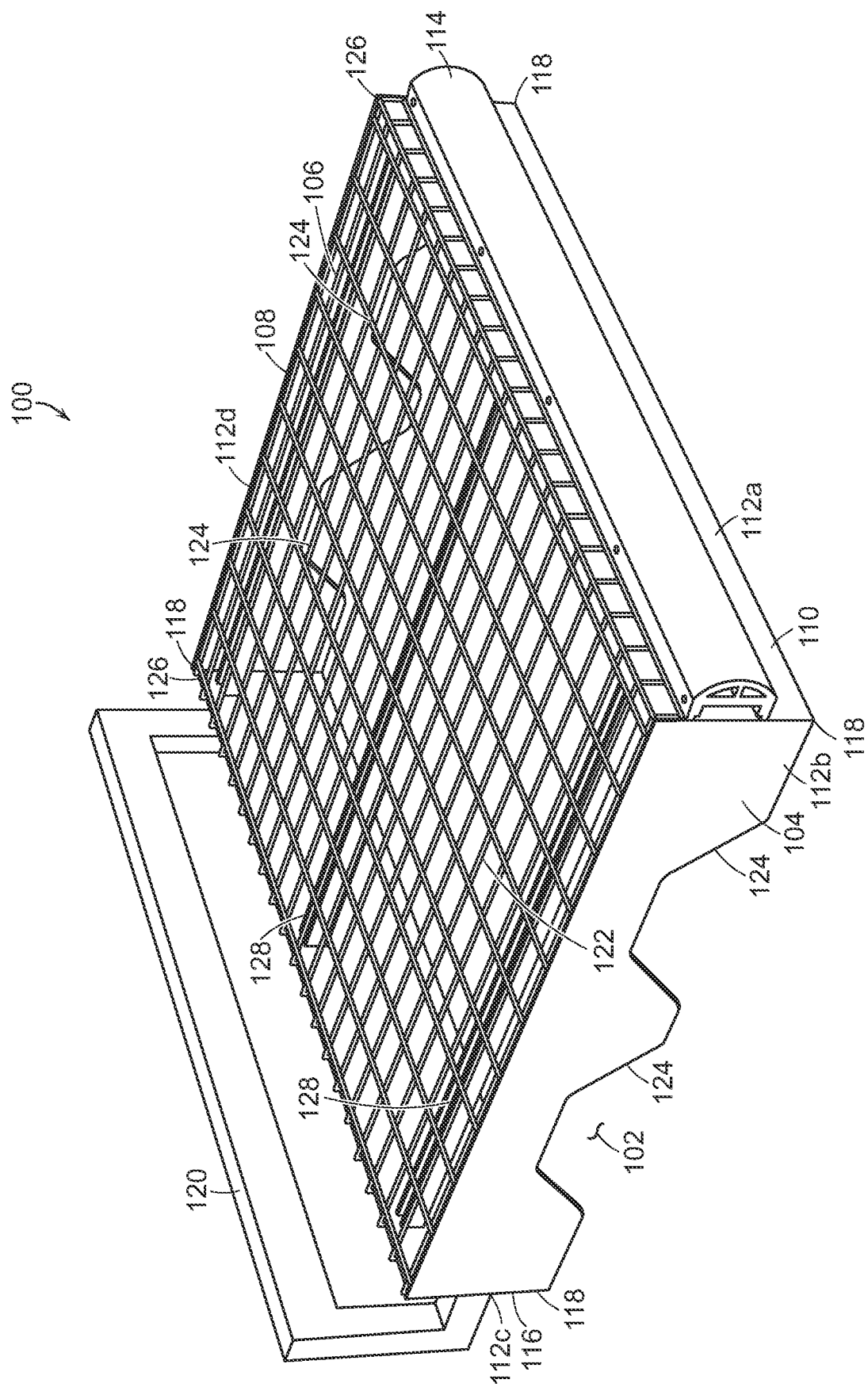
FIG. 1 is a pallet shelf with a bumper.

Referring to FIG. 1, a pallet shelf 100 is configured to be affixed to a surface 102 beneath a pallet shelving system (not shown). Very generally, the pallet shelf 100 is configured to bear palletized materials (not shown) and also acts as a physical impediment, blocking material handling vehicles from driving under the lowest shelf of the shelving system.

The pallet shelf 100 includes a four-sided frame 104 with a pallet deck 106 resting on a top side 108 of the frame 104. The four-sided frame 104 is made up of four elongate sides including a first side 112*a*, a second side 112*b*, a third side 112*c* and a fourth side 112*d*. An outer surface 110 of the first side 112*a* of the frame 104 has a bumper 114 attached thereto. An outer surface 116 of the third side 112*c* of the frame has a pallet stop 120 attached thereto.

1.1 Four-Sided Frame

Each side 112*a*-112*d* of the four-sided frame 104 is an elongate rectangular cuboid fabricated from steel or another suitable material. The ends 118 of each side 112*a*-112*d* are attached (e.g., welded) to the ends of other sides of the frame 104, such that the sides form a substantially rectangular or square shape with an open interior 122.

The first side 112a is a substantially solid member including through holes (not shown) configured to securely receive the bumper 114. The third side 112c is also a substantially solid member that is configured to securely receive the pallet stop 120.

The second side 112b and the third side 112c each include cut-outs 124. The cut-outs 124 allow for transport of the pallet shelf 100 (e.g., by resting on the forks for a forklift) and allow access to the surface 102 beneath the pallet shelf (e.g., for cleaning).

The four-sided frame 104 includes one or more anchoring members (not shown) for anchoring the frame 104 to the surface 102. For example, the four-sided frame 104 includes a number of flanges (not shown) though which screws or other suitable anchors can be inserted for anchoring the frame to the surface 102.

1.2 Pallet Deck

In some examples, the pallet deck 106 is a wire structure that is sized and shaped to mate with the four-sided frame 104. For example, in FIG. 1, the ends 126 of the pallet deck 106 are bent such that the pallet deck 106 is physically held on the four-sided frame 104. In some examples, the pallet deck 106 includes one or more reinforcing bars 128 extending along its length and/or width.

In some examples, the pallet deck 106 rests on the four-sided frame 104. In other examples, the pallet deck 106 is fastened to the four-sided frame 104 by welding, screws, or any other suitable fastening mechanism.

In some examples, types of pallet decks 106 other than wire structures can be used. For example, wooden, plastic, or steel pallet decks may be used.

1.3 Bumper

Figure 2:
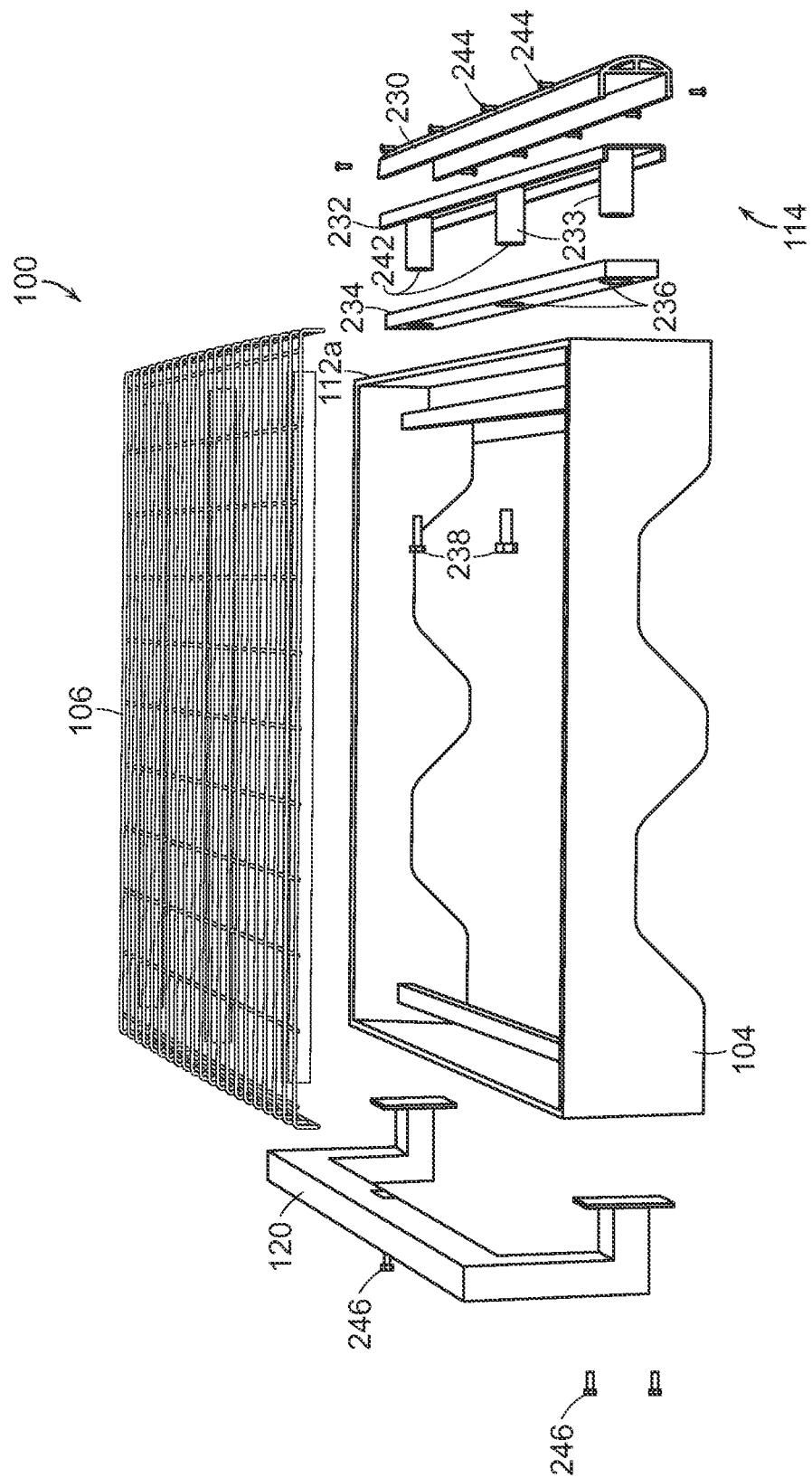
FIG. 2 is an exploded view of the pallet shelf of FIG. 1.
Figure 3:
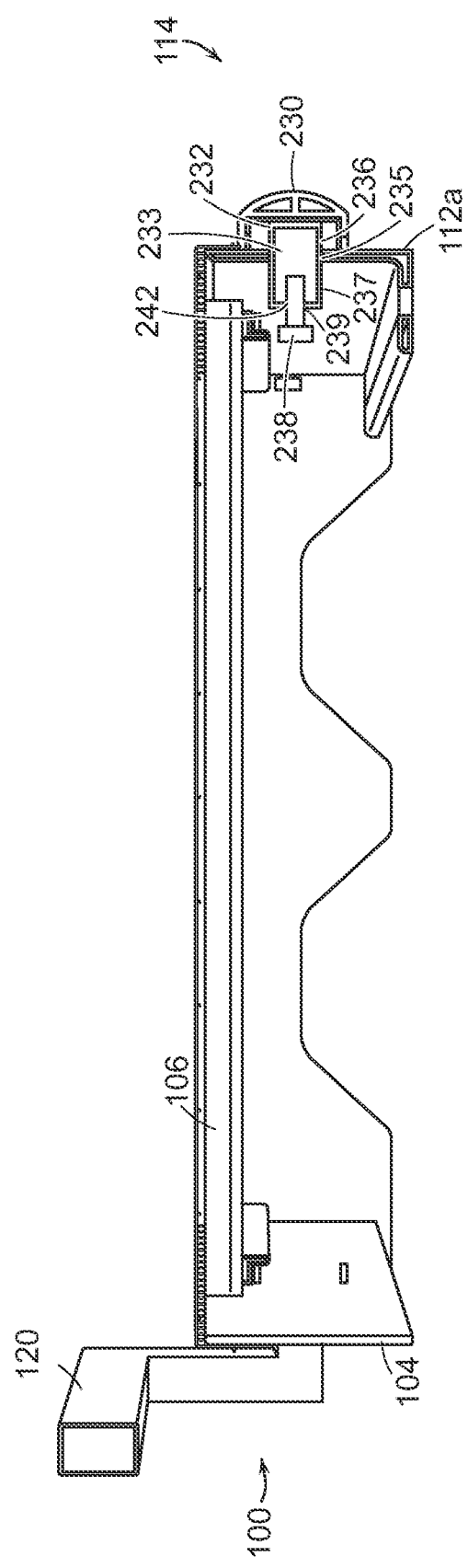
FIG. 3 is a cross-sectional view of the pallet shelf of FIG. 1.

Referring to FIGS. 2-3, the bumper 114 is an assembly including a resilient (e.g., plastic) cover 230, a load transfer member 232 including a number of bosses 233, and a resilient impact absorption member 234 (e.g., a die cut rubber strip) including corresponding number of through holes 236.

When the bumper 114 is assembled, bosses 233 of the load transfer member 232 are inserted through the corresponding through holes 236 in the resilient impact absorption member 234 and then through corresponding through holes 235 in the first side 112a of the four-sided frame 104. In some examples, the through holes 235 lead into female tubes 237 with closed ends that are sized and shaped to accommodate the bosses 233. Threaded screws 238 are inserted through holes 239 in the closed ends of the female tubes 237 and into threaded holes 242 in the ends of the bosses 233, securing the bosses 233 in the female tubes 237.

The screws 238 cannot be pulled through the holes 239 in the ends of the female tubes 237 and therefore cause the load transfer member 232 to hold the resilient impact absorption member 234 against the first side 112a of the four-sided frame 104. It is noted, however that the screws 238 do not tightly hold the bosses 233 against the closed ends of the female tubes 237, thereby allowing some movement of the load transfer member 232 relative to the female tubes 237.

The resilient cover 230 is then attached to the load transfer member 232 using a number of screws 244.

When the bumper 114 is struck, the resilient cover 230 absorbs the force up to a certain threshold. Beyond that threshold, the force of impact is transferred to the load transfer member 232, which moves in a direction toward the first wall 112a, with the bosses 233 of the load transfer member moving 232 into the female tubes 237 of the four-sided frame 104. As the load transfer member 232 moves toward the first wall 112a the resilient impact absorption member 234 is compressed, absorbing the additional force of impact.

1.4 Pallet Stop

The pallet stop 120 is a bar that is used to register (i.e., correctly position) pallets on the pallet shelf 100. For example, an operator can continue moving a pallet further onto the pallet shelf 100 until they feel the pallet contact the pallet stop 120. At that point, the operator can be confident that the pallet is registered on the pallet shelf 100.

The pallet stop 120 is fastened to the third side 112c using screws 246 or some other suitable fastening method.

The pallet stop 120 has a substantially L-shaped cross-section at its ends such that it is offset from the third side 112c of the four-sided frame 104 and has a height that rises above the pallet deck 106.

1.5 Alternatives and Miscellaneous Features

Figure 4:
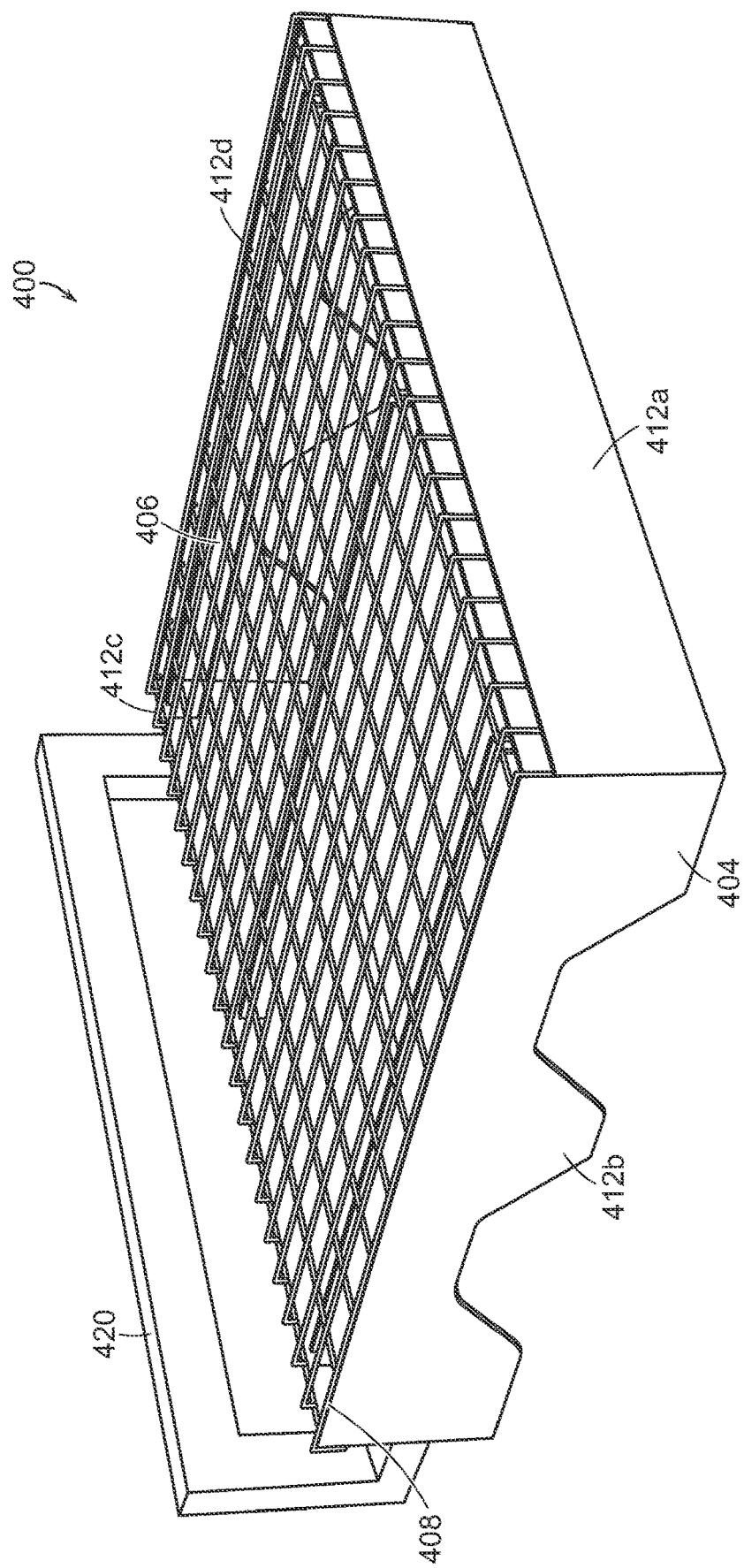
FIG. 4 is a pallet shelf without a bumper.

Referring to FIG. 4, another embodiment of the pallet shelf 400 is similarly configured to the pallet shelf 100 described above but does not include a bumper assembly. Instead, the pallet shelf 400 includes one or more reinforced sides for absorbing impacts. The pallet shelf 400 includes a four-sided frame 404 with a pallet deck 406 resting on a top side 408 of the frame 404. The four-sided frame 404 is made up of four elongate sides including a first side 412a, a second side 412b, a third side 412c and a fourth side 412d. The first side 412a of the frame 404 has an increased thickness (possibly relative to the other sides of the frame 404) or reinforcing structures (e.g., ribs) such that impact forces do not damage, deform, or unseat the pallet shelf. The third side 112c of the frame has a pallet stop 420 attached thereto.

In general, the pallet shelf is decoupled from any shelving system that it lies beneath. However, in certain embodiments, the pallet shelf may be coupled to a shelving system.

In some examples, the pallet shelf is designed to withstand the force of a 12,000 lb vehicle traveling in excess of 5 mph or a 15.1 kJ force.

In some examples, the pallet shelf is designed to fit in a 4-foot, 8-foot, or 12-foot bay.

In some examples, the pallet shelf is sized and shaped to occupy no more than 3 inches of aisle space when installed.

In some examples, the pallet shelf is sized and shaped to accommodate a 48-inch long pallet with 3 inches of overhang from the front and back of the pallet shelf.

In some examples, the pallet shelf is configured such that the anchors for securing the shelf to the surface do not penetrate through the thickness (e.g., 6-inches of concrete) of the surface.

In some examples, the pallet shelf does not include the pallet stop.

The different parts of the pallet shelf can be made from any number of suitable materials such as plastics, rubbers, and metals. In some examples, the materials of the pallet shelf are chosen to meet or exceed the V1 UL94 flame class standard.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A shelving assembly comprising:
    a frame configured to be affixed to a surface and having a plurality of sides, a first side of the plurality of sides having a wall with a plurality of through holes formed through a thickness of the wall, the wall having a flat outer surface, and the plurality of through holes having openings at the flat outer surface and leading into a plurality of female tubes with closed ends;
    a bumper assembly attached to the wall of the first side, the bumper assembly including
        a resilient cover, and
        a load transfer member disposed partially within the resilient cover and having a plurality of protrusions configured to be received in corresponding female tubes of the plurality of through holes formed through the thickness of the wall of the first side;
    wherein a corresponding fastener of one or more fasteners extends into each of the plurality of female tubes, wherein each fastener is coupled to a portion of the load transfer member and retains at least some of the portion of the load transfer member in the female tubes; and
    a deck disposed on top of the frame.

2. The shelving assembly of claim 1 wherein the bumper assembly includes an impact absorption mechanism.

3. The shelving assembly of claim 2 wherein the impact absorption mechanism includes a resilient impact absorption member.

4. The shelving assembly of claim 3 wherein the resilient impact absorption member is disposed between the load transfer member and the wall of the first side of the frame such that at least some force applied to the load transfer member is absorbed by the resilient impact absorption member rather than being transferred to the frame.

5. The shelving assembly of claim 3 wherein the resilient cover is coupled to the load transfer member such that at least some force applied to the resilient cover is absorbed by the resilient cover rather than being transferred to the load transfer member.

6. The shelving assembly of claim 1 wherein the first side of the frame has a material thickness configured to prevent deformation of the frame upon being struck by an object.

7. The shelving assembly of claim 1 wherein the frame includes one or more reinforcing ribs to prevent deformation of the frame upon being struck by an object.

8. The shelving assembly of claim 1 wherein one or more sides of the plurality of sides includes one or more notches for providing access to an area beneath the shelving assembly.

9. The shelving assembly of claim 1 further comprising a positioning member for guiding positions of objects placed on the deck of the shelving assembly.

10. The shelving assembly of claim 9 wherein the positioning member is attached to a side of the frame and extends above the deck of the shelving assembly.

11. The shelving assembly of claim 1 wherein the frame includes one or more attachment points for fastening the shelving assembly to a surface.

12. The shelving assembly of claim 2 wherein the plurality of protrusions are in the form of a plurality of bosses and are received in the corresponding female tubes of the plurality of through holes formed through the thickness of the wall of the first side are configured to be movable within the female tubes.

13. The shelving assembly of claim 12 wherein a motion of the plurality of bosses relative to the corresponding female tubes is limited to a predetermined range of motion.

14. The shelving assembly of claim 13 further comprising a plurality of screws configured to be positioned within the plurality of female tubes, the extent to which the screws are positioned within the plurality of female tubes determining an extent of the range of motion of the plurality of bosses within the plurality of female tubes.

15. The shelving assembly of claim 1 wherein the plurality of female tubes have a plurality of through holes through the closed ends of the plurality of female tubes.

16. The shelving assembly of claim 1 wherein sizes and shapes of the plurality of through holes are non-deformable.

17. The shelving assembly of claim 14 wherein the extent to which the screws are positioned within the plurality of female tubes determines the degree of compression of the impact absorption mechanism.

* * * * *